United States Patent [19]

Maier et al.

[11] Patent Number: 4,606,685
[45] Date of Patent: Aug. 19, 1986

[54] ROUTER WITH DUST EXHAUST

[76] Inventors: Peter Maier, Gerokstrasse 1, 7311 Neidlingen; Karl Attinger, Seestrasse 21, 7311 Holzmaden; Albert Sigel, Scholderplatz 21, 7315 Weilheim; Gernot Hänsel, Gerstenstrasse 31, 7000 Stuttgart 70; Erwin Kutscher, Hohenstaufenstr. 24, 7333 Ebersbach-Bünzwangen; Hartmut Walter, Im Saemann 71, 7050 Waiblingen, all of Fed. Rep. of Germany

[21] Appl. No.: 601,636

[22] Filed: Apr. 18, 1984

[30] Foreign Application Priority Data

Apr. 21, 1983 [DE] Fed. Rep. of Germany ....... 3314419

[51] Int. Cl.$^4$ .............................................. B23C 1/06
[52] U.S. Cl. ..................................... 409/137; 51/273; 144/251 A; 409/134; 409/182
[58] Field of Search ...................... 144/251 A, 252 R; 83/100, 169; 51/273; 29/DIG. 84, DIG. 86; 408/56, 58, 67, 710; 409/134, 137, 181, 182

[56] References Cited

U.S. PATENT DOCUMENTS

| | | | |
|---|---|---|---|
| 1,581,719 | 4/1926 | Carter | 409/137 |
| 3,009,494 | 11/1961 | Hinkley | 144/251 A |
| 3,022,806 | 2/1962 | Johnston | 144/252 R |
| 3,062,075 | 11/1962 | Saha | 408/103 |
| 3,942,411 | 3/1976 | Gerber | 409/137 |
| 4,051,880 | 10/1977 | Hestily | 144/252 R |
| 4,135,334 | 1/1979 | Rudiger | 51/273 |
| 4,397,342 | 8/1983 | North | 144/251 A |
| 4,484,845 | 11/1984 | Penella, Jr. et al. | 409/134 |

FOREIGN PATENT DOCUMENTS 567901  8/1977  U.S.S.R. ......................... 144/252 R

Primary Examiner—Gil Weidenfeld
Assistant Examiner—Daniel W. Howell
Attorney, Agent, or Firm—McGlew and Tuttle

[57] ABSTRACT

A router comprises a cage supporting a drive unit having a shaft on which a cutter can be fixed. A rest plate is provided with an aperture for moving the cutter therethrough. The rest plate is connected to the cage through two guide columns on which it is displaceable in axial directions of the cutter and arrestable in a selected position. The rest plate is a hollow structure open downwardly where it is closed by a detachable cover having a smooth outer surface. A cavity of the plate communicates with and encircles the aperture 21 for the cutter and grows toward an exhaust connection which extends tangentially to the cutter, i.e. in the direction in which the millings are thrown. The exhaust connection can be connected to an exhauster. Laterally on the rest plate, an adjustable slide stop may be provided having an angled leg which can be brought into a position flush with the bottom surface of the rest plate or moved downward therefrom. A chip screen is mounted for adjustable movement toward and away from the rest plate.

13 Claims, 7 Drawing Figures

ROUTER WITH DUST EXHAUST

FIELD AND BACKGROUND OF THE INVENTION

This invention relates in general to cutting devices and in particular to a new and useful routing machine having an exhaust for the cuttings.

Routers are known from German utility model 18 80 464 and from a prospectus "Milling" by the company Elu Eugen Lutz KG, Muhlacker, Germany. They comprise a massive rest plate, and do not provide an exhauster.

Such routers do not satisfactorily protect the operator from chips and from the abrasive dust which is produced during the milling of most various materials, and is obstructive, if not directly harmful. This is particularly the case if a router equipped with a slide stop is employed for removing putty from window frames.

German No. OS 27 19 979 discloses a router equipped with a slide stop in the form of an angle piece which is adjustable to selected levels and mounted laterailly on the rest plate. The slide stop comprises a flat leg extending in the direction of the cutter, parallel to the rest plate. Further, the catalogue 69/70 of the company Elu shows an edge router having a guide stop designed as a shield-shaped sliding shoe.

U.S. Pat. No. 3,022,806 discloses a router equipped with an exhauster. German Pat. No. 861,812 discloses a disc-type grinding machine with a dust exhauster. These references are generically different.

SUMMARY OF THE INVENTION

In accordance with the invention a routing machine comprises a drive unit cage with a drive unit therein driving a cutter shaft which extends downwardly from the cage and carries a cutter which rotates therewith and projects through an aperture of a rest plate. The rest plate is guided on guide columns for movement toward and away from the cage and in accordance with the invention it includes a cavity defined around a cutter aperture therethrough and communicates with the aperture and provides an exhaust conduit which is connectable to an exhaust discharge for carrying away the debris of the cutting operation.

Accordingly it is an object of the invention to provide an improved router having exhaust means.

A further object of the invention is to provide a router which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
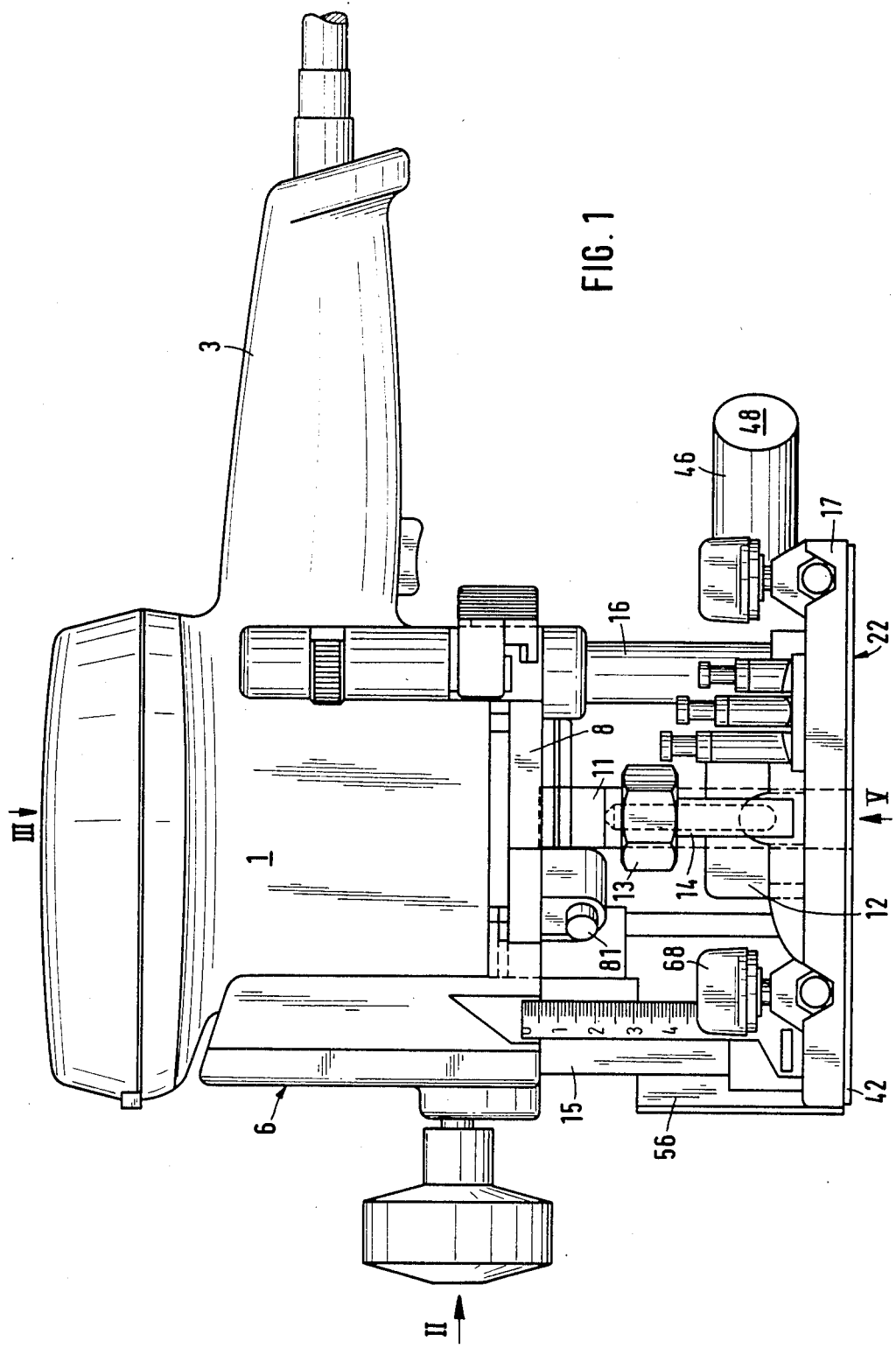
FIG. 1 is a side elevational view of a router constructed in accordance with the invention.

Referring to the drawings in particular the invention embodied therein a comprises a router which includes a drive unit 1 and a drive cage which has a cutter shaft 11 which extends downwardly from the cage and carries a rotatable cutter 12 which passes through an aperture 21 of a rest plate 17. In accordance with the invention the rest plate defines a cavity 40 surrounding the aperture 21 which is advantageously spirally shaped so that it diverges outwardly to an exhaust connection 46 having an outlet 48.

Referring to FIG. 1, a router is shown comprising a drive unit 1 which is supported on a base plate 8 of a cage 6. Base plate 8 has an aperture through which a shaft 11 carrying a cutter 12 extends. The shaft 12 is mechanically rotated by drive unit 1 and it extends downwardly.

Cage 6 is connected through guide columns 15, 16 to a rest plate 17 which is displaceable on the columns in the axial direction of cutter 12 on shaft 11, for adjustment in height.

An aperture is provided in rest plate 17, through which cutter 12 can be moved.

Figure 2:
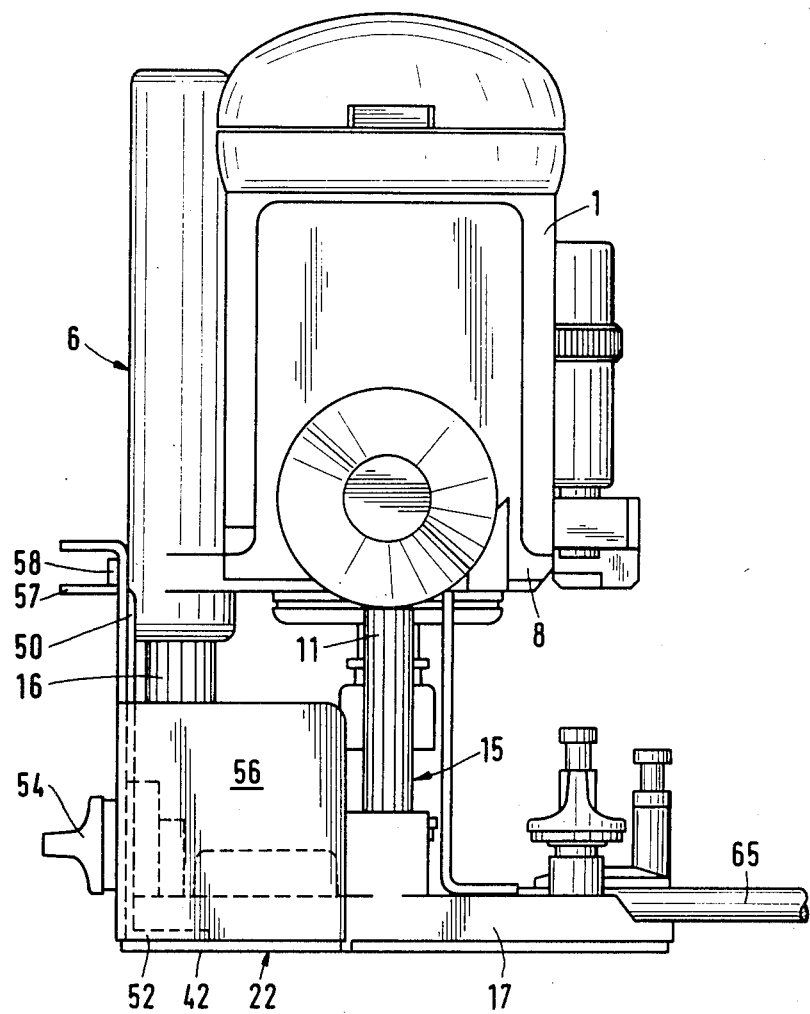
FIG. 2 is a front elevational view taken in the direction II of FIG. 1.
Figure 5:
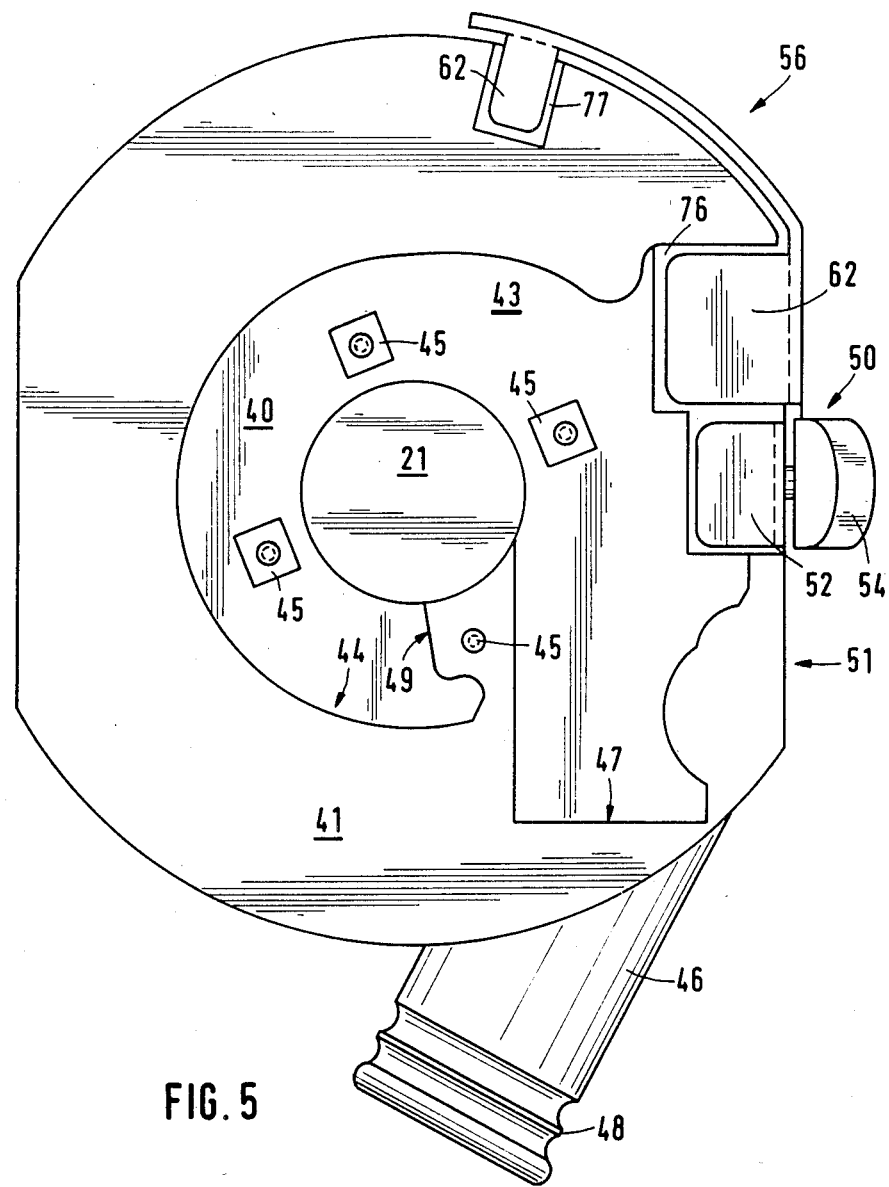
FIG. 5 is a bottom view of the router with the cover closing the rest plate removed.

To protect the operator from milling dust and larger chips which may be slung away in an uncontrolled manner, it is provided to design the rest plate 17 as a hollow body having a cavity 40 which is open to and encircles aperture 21 for cutter 12. This arrangement makes sure that dust and chips accumulate in cavity 40. FIG. 5 shows a first embodiment of such a hollow rest plate 17. The rest plate 17 is open on its underside 41 over a substantial portion of its surface area. Only, during operation, underside 41 is closed by a cover 42 having a hole only in the area of aperture 21, for the cutter 12. A cover 42 is shown in FIGS. 1 and 2, but not in FIG. 5. Cover 42, and a top wall 43 of the rest plate 17, and a circular wall 44 of the rest plate 44 form the boundaries of the cavity 40. In the interior of the cavity 40, fastening elements 45 are provided by which cover 42 is secured to the hollow body or rest plate 17. The fastening elements are screwable, to be able to remove cover 42 from cavity 40 if cleaning is needed. At least the contacting surface 22 of rest plate 17 is smooth, so as to ensure a small friction and thus an exact guidance of the router on the workpiece. Cover 42 may be made of a plastic.

As already mentioned, cavity 40 is an annular channel surrounding aperture 21 and serving the purpose of collecting milling dust which is tangentially centrifuged from rotating cutter 12. Cavity 40 may in addition be connected through an exhaust connection 46 to an exhauster. The exhaust connection 46 should be disposed substantially tangentially of cavity 40, i.e. in the direction in which the millings are thrown. In the embodiment of FIG. 5, the inlet 47 of exhaust connection 46 is provided at the periphery of rest plate 17. From inlet 47, exhaust connection 46 extends obliquely to the longitudinal central plane of the router, and its outlet 48 in the form of pipe nipple is located below the centrally extending handle 3 of the router. In this embodiment, the tangential orientation of the exhaust connection relative to cavity 40 results in a very efficient exhaustion. This efficiency may further be increased by providing a cavity 40 of spiral shape, with the volute extending from a separating wall 49 to exhaust connection 46. Depending on the amount of dust to be taken off over its length, the spiral cavity may grow larger toward exhaust connection 46.

Figure 3:
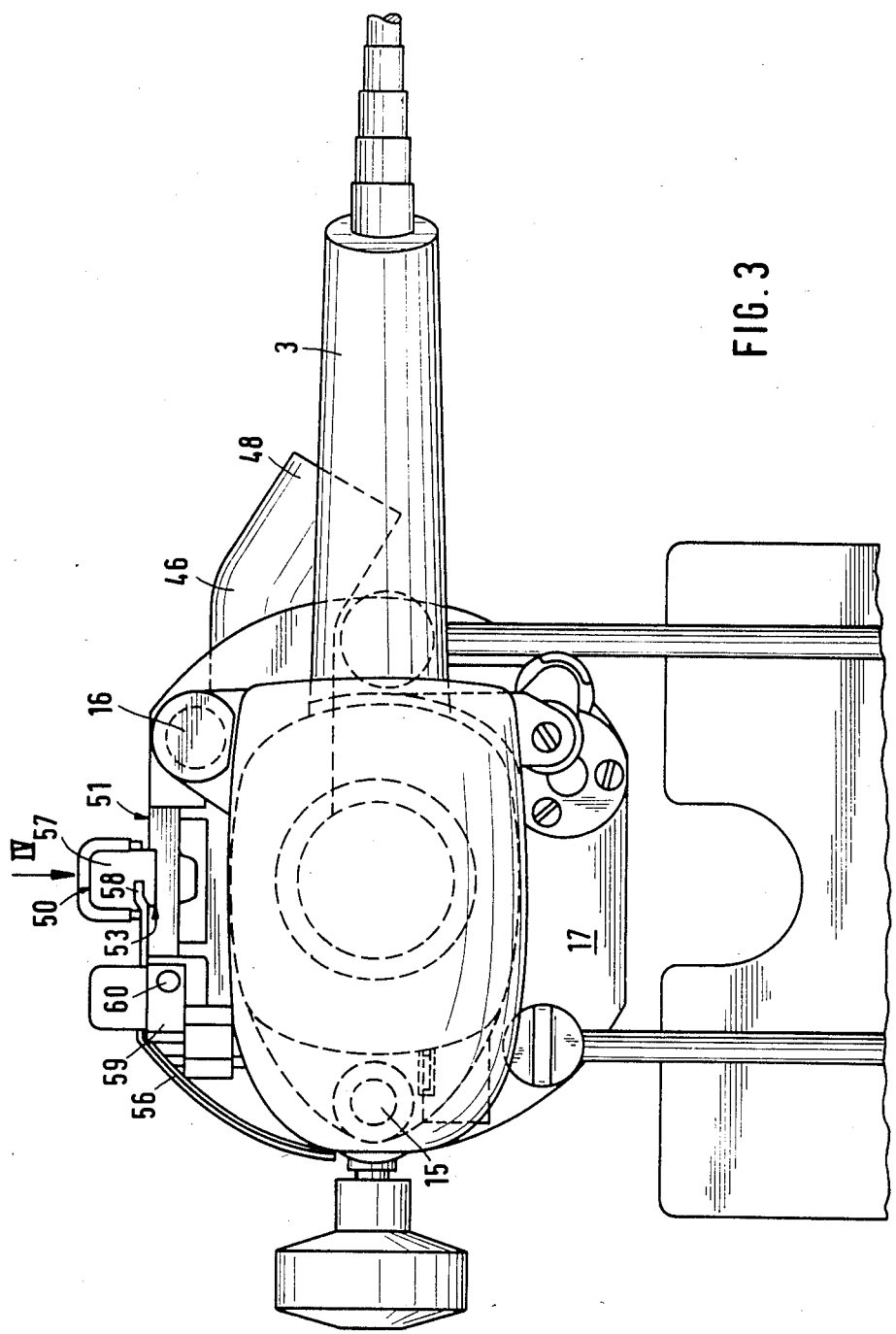
FIG. 3 is a top plan view taken in the direction III of FIG. 1.
Figure 4:
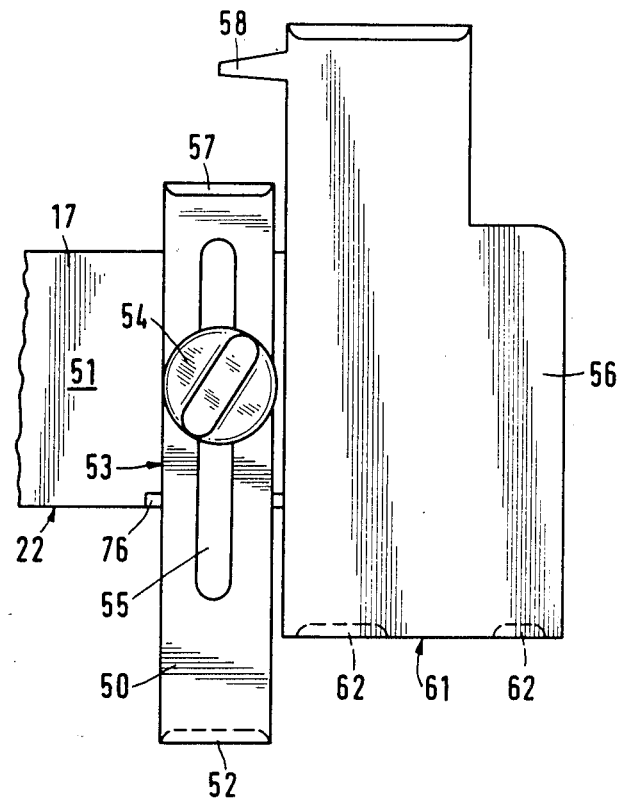
FIG. 4 is a side elevational view of a slide stop and a chip screen taken in the direction IV of FIG. 3.

The router shown in FIGS. 2, 3 and 4 is an embodiment well suitable for working stepped sections, particularly for removing putty from window frames. Such a router comprises an additional slide stop 50 which can be adjusted in height relative to contact surface 22 of rest plate 17, and arrested in position. This slide stop forms an additional point of support for milling stepped sections. While on one side of cutter 12, rest plate 17 is guided on the upper edge of a shoulder of the workpiece, slide step 50 is guided on the lower edge of the shoulder. It will be understood that this results in a stable guidance of the router even on stepped or similar sectional workpieces, and effectively prevents the tool from tilting. To be able to particularly also mill corners of workpieces, slide stop 50 is designed as a narrow angle piece which is mounted about at the level of cutter 12 on a side wall 51 of rest plate 17, and has a leg 52 which is angled parallel to contact surface 22 of rest plate 17. Leg 52, by which slide stop is guided on the workpiece, should be smooth. Therefore, it may be made of the same material as cover 42 of the rest plate 17. Leg 52 is angled in the direction of cutter 12. Consequently, a recess 76, or cutout, fitting leg 52 may be provided in the underside 41 of rest plate 17. With slide stop entirely retracted, leg 52 comes to apply against surface 22, or into a position flush therewith. In this end position, slide stop 50 is ineffective, so that the router can be guided, as usual, in superficial contact with the workpiece.

Slide stop 50 can be moved in and along a guide groove 53 provided in side wall 51 of rest plate 17. Either the long leg of the angle forming slide stop 50 or a guide rib provided thereon and comformable to groove 53 engages guide groove 53, for displacement therein. Slide stop 50 can be arrested at certain levels by means of a set screw 54 which may be passed through an oblong slot 55 in the slide stop and screwed into the bottom of guide groove 53. Oblong slot 55 permits slide stop 50 to occupy positions between an end position corresponding to the completely retracted leg 52, and an end position corresponding to the maximum extension of stop 50. The desired position is then fixed with screw 54.

While milling stepped workpieces with slide stop 50 extended, the working range of cutter 12 is partly open toward the slide stop, so that chips and dust are slung outwardly unhindered. Slide stop 50 is not an effective dust catcher; however, to widen it for this purpose is prohibitive, since this would prevent a tool from milling corners. In addition to slide stop 50, a chip screen 56 is provided, by which rest plate 17 is embraced along a portion of its periphery. Chip screen 56 can be lowered to the bottom edge of slide stop 50, and thus effectively intercept the milling particles; however, the chip screen can also be elevated, independently of slide stop 50, and thus removed from the working range of cutter 12, if a corner is approached.

One embodiment of chip screen 56 is shown in FIGS. 3, 4 and 5. In that design, chip screen 56 is a curved metal sheet conformed to the contour of rest plate 17. Rest plate 17 has a rectangular configuration with widely rounded corners and chip screens 56 embraces one of the corner portions. If forms a shield bent therearound and extending from slide stop 50 to about the mid plane of the router in the advance direction. Chip screen 56 can be lowered relative to contact surface 52 in the same way as slide stop 50. Only the lowering is limited by the respective adjusted level of slide stop 50. To this end, a bent shoulder 57 is provided on the upper end of slide stop 50 and a projecting finger 58 is provided thereabove on chip screen 56. While lowering chip screen 56, finger 58 butts against shoulder 57 as soon as the adjusted level is reached. Chip screen 56 may be guided in the same way as slide stop 50, namely by a guide rib engaging a groove (not shown), Alternatively, chip screen 56 may be carried by a block 59 which is engaged on a rod 60. By proper dimensioning, it may be obtained that block 59 will remain fixed in any position simply by the friction between rod 60 and the fitting hole of the block, so that no particular arresting means is needed. Further, in the shown embodiment, two lugs 62 are provided projecting from chip screen 56 parallel to contact surface 22 toward cutter 12. In retracted position of chip screen, lugs 62 come into a position within recesses 76 and 77 of rest plate 17 and flush therewith. Lugs 62 thus are arranged in the same way as leg 52 of slide stop 50, and also facilitate the milling close above the workpiece surface.

Figure 6:
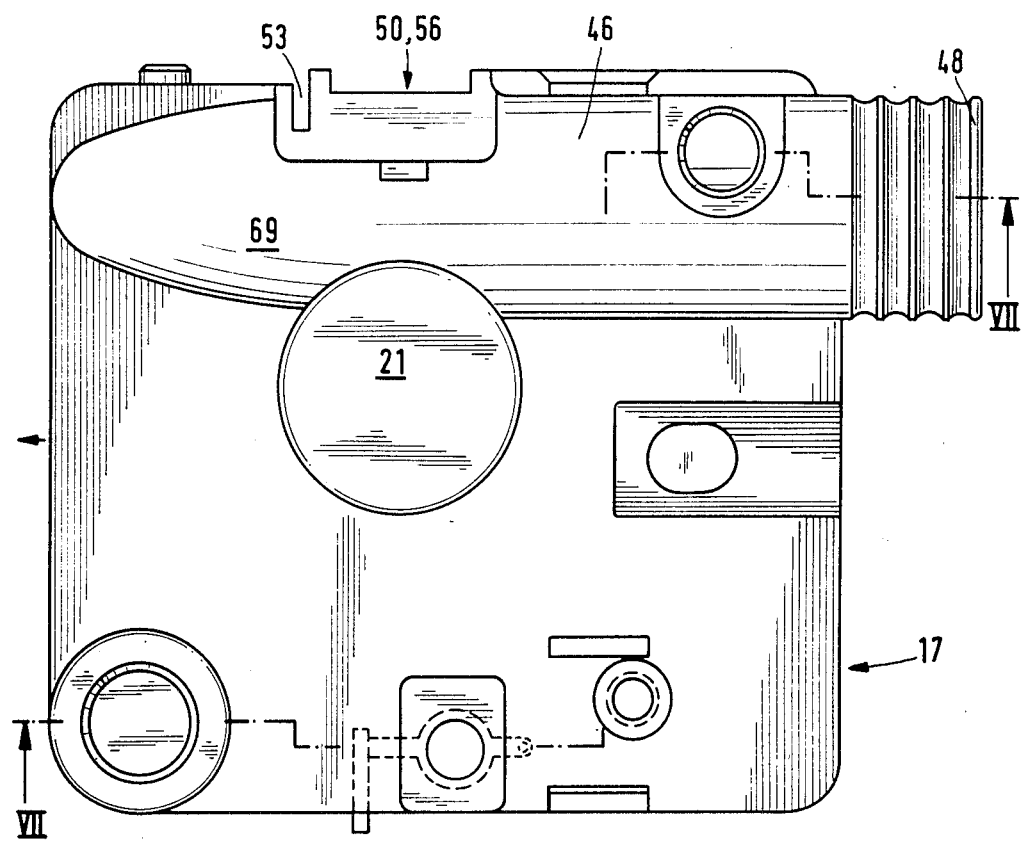
FIG. 6 is a top plan view of a rest plate of another embodiment of router.
Figure 7:
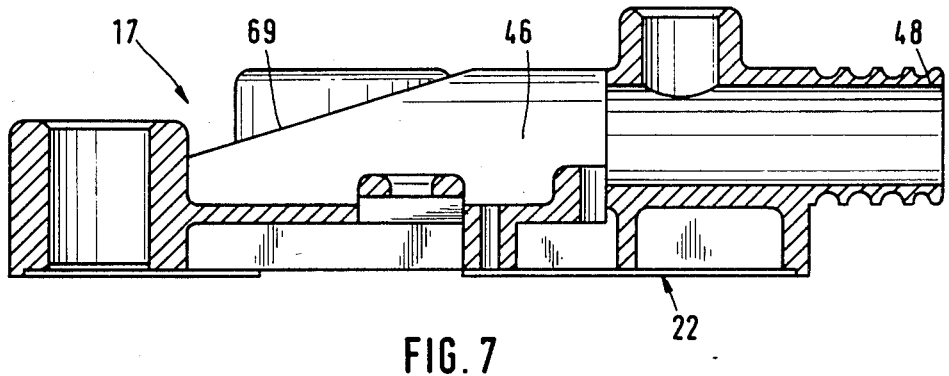
FIG. 7 is a sectional view of the rest plate taken along the line VII—VII of FIG. 6.

FIGS. 6 and 7 show another embodiment of rest plate 17'. Like elements are designated with the same reference numerals. Again, an aperture 21 is provided for cutter 12, and a cavity around the aperture 21 is provided which ends with an exhaust connection 46'. Only, connection 46' does not extend obliquely, it extends straight away from rest plate 17, which may be advantageous for a further connection. As shown particularly in FIG. 7, in its portion 69, exhaust connection 46 grows larger toward outlet 48 which is designed for being engaged by a flexible tube. FIG. 6 further shows a groove 53 for guiding slide stop 50 or chip screen 56 vertically.

While specific embodiments of the invention have been shown and described in detail to illustrate the application of the principles of the invention, it will be understood that the invention may be embodied otherwise without departing from such principles.

What is claimed is:

1. A router, comprising a drive unit housing, a rotatable cutter shaft extending out of said housing for carrying a cutter, guide column means extending out of said housing in the same direction as that of said cutter shaft, a rest plate having a contact surface for engaging a workpiece, said rest plate guided on said column means for movements toward and away from said housing and having an aperture therethrough for the passage of a cutter on the cutter shaft and aligned with the cutter shaft, said rest plate having a cutting cavity in said contact surface surrounding the aperture and surrounding a cutter carried on the shaft, said cavity extending outwardly for exhausting chips cut by the cutter away from the aperture, said rest place having an exhaust connection with an inlet communicating with said cutting cavity for removing chips from the cavity, a chip screen mounted on said rest plate along the periphery thereof, said chip screen extending parallel to the shaft and being lowerable to a maximum lowered position in a direction parallel to the shaft below said contact surface, a slide stop mounted on said rest plate adjacent said chip screen and extending parallel to the shaft and lowerable below the contact surface in a direction parallel to the shaft, and means on said chip screen and slide stop which are engageable at the maximum lowered position of said chip screen so that said chip screen can be lowered only as far as said slide stop is lowered and said chip screen can be lowered to a lesser extent than said slide stop.

2. A router according to claim 1, wherein said guide column means includes a plurality of guide columns, spaced substantially equally from said cutter, said rest plate being adjustable in position along said guide columns and being a hollow body defining said cavity surrounding said aperture, and a cover closing said rest plate having a smooth workpiece engaging surface.

3. A router according to claim 1, wherein the cavity of said rest plate encircles the aperture therein and is of a spiral configuration.

4. A router according to claim 1, wherein said rest plate includes an open bottom portion, a cover covering the open bottom portion of said rest plate adapted to rest against the workpiece closing the cavity from the bottom, said cavity extending around a major portion of the aperture and lodging radially and said exhaust connection comprising an exhaust pipe connection to said cavity extending tangentially in respect to the aperture.

5. A router according to claim 1, wherein said chip screen includes a lower edge having at least one inwardly extending lug extending toward said cutter shaft and said rest plate having a cover portion defining the contact surface, said lug of said chip screen extending parallel to said surface, said rest plate having a recess along a periphery thereof into which said chip screen lug is positionable so that said lug is flush with said contact surface.

6. A router according to claim 5, wherein said slide stop is adjustably mounted on said rest plate for upward and downward movement, said rest plate having a slide stop leg receiving recess including a slide stop leg carried by said slide stop engageable in said recess, and means for adjusting said leg in an adjustable elevational position.

7. A router according to claim 6, wherein said slide stop includes an angle shoulder at its upper edge, said chip screen having a finger projecting in a direction toward said shoulder overlying said shoulder.

8. A router according to claim 7, wherein said slide stop is non-rotatably retained in a guide groove of said rest plate.

9. A router according to claim 1 wherein said slide stop includes an outwardly extending shoulder, said chip screen having a protruding finger extending over said shoulder for engaging said shoulder when said chip screen is lowered to its maximum extent which is no more than the maximum extent to which said slide stop is lowered with respect to said rest plate.

10. A router according to claim 9, wherein said slide stop includes a leg extending inwardly with respect to said rest plate, said rest plate having a recess in its contact surface for receiving said leg so that said leg is flush with said contact surface, said chip screen having at least one lug extending inwardly toward said rest plate, said rest plate having at least one additional recess for receiving said lug so that said lug lies flush with said contact surface, said lug and leg extending flush with said contact surface when said slide stop and said chip screen are in their fully raised position with respect to said rest plate.

11. A router according to claim 10 wherein said rest plate has a rounded corner, said chip screen being rounded and engaged around said corner.

12. A router according to claim 1, wherein said rest plate has a rounded corner, said chip screen being rounded and engaged around said corner.

13. A router according to claim 1, wherein said slide stop includes a leg extending inwardly with respect to said rest plate, said rest plate having a recess in its contact surface for receiving said leg so that said leg is flush with said contact surface, said chip screen having at least one lug extending inwardly toward said rest plate, said rest plate having at least one additional recess for receiving said lug so that said lug lies flush with said contact surface, said lug and leg extending flush with said contact surface when said slide stop and said chip screen are in their fully raised position with respect to said rest plate.

* * * * *